United States Patent
Tsuchida et al.

(10) Patent No.: US 8,557,445 B2
(45) Date of Patent: Oct. 15, 2013

(54) ALL SOLID STATE BATTERY CONTAINING AN ELECTROLYTE COMPRISING CHALCOGENS

(75) Inventors: Yasushi Tsuchida, Susono (JP); Yukiyoshi Ueno, Gotenba (JP); Shigenori Hama, Susono (JP); Masato Kamiya, Susono (JP); Hiroshi Nagase, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 500 days.

(21) Appl. No.: 12/768,117

(22) Filed: Apr. 27, 2010

(65) Prior Publication Data

US 2010/0273062 A1    Oct. 28, 2010

(30) Foreign Application Priority Data

Apr. 28, 2009   (JP) ................... 2009-109301

(51) Int. Cl.
*H01M 6/18* (2006.01)
*H01M 4/48* (2010.01)

(52) U.S. Cl.
USPC .................. 429/304; 429/231.5; 429/231.95

(58) Field of Classification Search
USPC ......... 429/209, 306, 162, 304, 231.5, 231.95; 501/40; 252/500
See application file for complete search history.

(56) References Cited

U.S. PATENT DOCUMENTS

| | | | | |
|---|---|---|---|---|
| 5,158,840 A | * | 10/1992 | Megerle | 429/104 |
| 5,401,597 A | * | 3/1995 | Jarvis et al. | 429/311 |
| 5,695,873 A | * | 12/1997 | Kumar et al. | 428/325 |
| 2004/0029005 A1 | * | 2/2004 | Leising et al. | 429/218.1 |
| 2004/0185336 A1 | * | 9/2004 | Ito et al. | 429/152 |
| 2005/0107239 A1 | * | 5/2005 | Akiba et al. | 501/40 |
| 2007/0184345 A1 | * | 8/2007 | Neudecker et al. | 429/209 |
| 2009/0068563 A1 | * | 3/2009 | Kanda et al. | 429/306 |
| 2012/0034529 A1 | | 2/2012 | Tatsumisago et al. | |

FOREIGN PATENT DOCUMENTS

| | | |
|---|---|---|
| CN | 101388470 A | 3/2009 |
| JP | 2011-219722 A | 8/1999 |
| JP | 2005-228570 A | 8/2005 |
| JP | 2008-103280 A | 5/2008 |
| JP | 2008-120666 A | 5/2008 |
| JP | 2008-176981 A | 7/2008 |
| JP | 2008-243736 A | 10/2008 |
| JP | 2009-146657 A | 7/2009 |

(Continued)

OTHER PUBLICATIONS

"All Solid-state Lithium Secondary Batteries Using High Lithium Ion Conducting Li2S-P2S5 Glass-Ceramics", Mizuno et al., Chemistry Letters, 2002, p. 1244-1245.*

(Continued)

*Primary Examiner* — Kenneth Douyette
(74) *Attorney, Agent, or Firm* — Sughrue Mion, PLLC (57) ABSTRACT

An all-solid-state battery includes: a positive electrode active material layer that contains a positive electrode active material, and a first sulfide solid electrolyte material that contacts the positive electrode active material and that substantially does not have a cross-linking chalcogen; a negative electrode active material layer containing a negative electrode active material; and a solid electrolyte layer that is provided between the positive electrode active material layer and the negative electrode active material layer, and that contains a second sulfide solid electrolyte material that substantially has a cross-linking chalcogen.

10 Claims, 7 Drawing Sheets

(56) References Cited

FOREIGN PATENT DOCUMENTS

| | | |
|---|---|---|
| JP | 2009-176484 A | 8/2009 |
| JP | 2010-218827 A | 9/2010 |
| JP | 2011-028893 A | 2/2011 |
| JP | 2011-060649 A | 3/2011 |
| JP | 2011-076792 A | 4/2011 |
| WO | 2008/123394 A1 | 10/2008 |
| WO | 2010/098177 A1 | 9/2010 |

OTHER PUBLICATIONS

"Formation of Li+ superionic crystals from the Li2S-P2S5 melt-quenched glasses", Hayashi et al., Journal of Material Science, (2008) 43:1885-1889.*

"Rechargeable lithium batteries, using sulfur-based cathode materials and Li2S-P2S5 glass-ceramic electrolytes", Hayashi et al., Electrochimica Acta, vol. 50, Issues 2-3, Nov. 30, 2004, p. 893-897.*

"Crystal structure of a superionic conductor, Li7P3S11", Yamane et al. Solid State Ionics, vol. 178, Issues 15-18, Jun. 2007, p. 1163-1167.*

Fuminori Mizuno et al.: "High lithium ion conducting glass-ceramics in the system $Li_2S-P_2S_5$", Solid States Ionics 177 (2006) 2721-2725.

Chinese Office Action issued in copending Chinese application No. CN 20101069197.3 on Jul. 3, 2012.

Nagao, N., et al., 2009 "Characterization of all-solid-state lithium secondary batteries using CuxMo6S8-y electrode and Li2S-P2S5 solid electrolyte," Journal of Power Sources, vol. 189, pp. 672-675.

Japanese Office Action issued on Aug. 21, 2012 in JP 2009-109301 and partial translation thereof.

* cited by examiner

ALL SOLID STATE BATTERY CONTAINING AN ELECTROLYTE COMPRISING CHALCOGENS

INCORPORATION BY REFERENCE

The disclosure of Japanese Patent Application No. 2009-109301 filed on Apr. 28, 2009 including the specification, drawings and abstract is incorporated herein by reference in its entirety.

BACKGROUND OF THE INVENTION

1. Field of the Invention

The invention relates to an all-solid-state battery that is excellent in durability.

2. Description of the Related Art

Along with the recent rapid spread of information appliances, communication appliances, etc., such as personal computers, video cameras, cellular phones, etc., the development of an excellent battery (e.g., the lithium battery) as a power source of the foregoing appliances is regarded as being important. Besides, in fields other than the information appliances and the communication appliances, for example, in the motor vehicle industry, lithium batteries and the like for use in electric motor vehicles and hybrid motor vehicles are being developed.

The lithium batteries presently available on a commercial basis employ an organic electrolytic solution whose solvent is a combustible organic solvent. Therefore, there is a need for provision of a safety device that restrains the temperature rise at the time of shortcircuit, and for improvement in structure and material for preventing shortcircuit. However, all-solid-state batteries that use a solid electrolyte instead of a liquid electrolyte allow simplification of the safety device because of the absence of a combustible organic solvent in the battery, and therefore are considered to be excellent in production cost and productivity.

In the field of the foregoing all-solid-state batteries, a sulfide solid electrolyte material has been known. For example, a non-patent literature (Fuminori Mizuno et al., "High lithium ion conducting glass-ceramics in the system $Li_2S-P_2S_5$", Solid State Ionics 177 (2006) 2721-2725) discloses a glass ceramics (sulfide solid electrolyte material) that has a composition of the system $Li_2S-P_2S_5$ and a high Li ion conductivity. Furthermore, this document also discloses that cross-linking sulfur (a central portion of the $S_3P-S-PS_3$ structure) contributes to the high Li ion conductivity. Besides, Japanese Patent Application Publication No. 2005-228570 (JP-A-2005-228570) discloses a crystallized glass (sulfide solid electrolyte material) that has a composition of the system $Li_2S-P_2S_5$ and a high Li ion conductivity. Furthermore, the Japanese Patent Application Publication No. 2005-228570 (JP-A-2005-228570) also discloses that when the crystallized glass is to be fabricated, the amount of $Li_2S$ is 68 mol % to 74 mol %, and the amount of $P_2S_5$ is 26 mol % to 32 mol %, and the sintering is performed in the temperature range of 150° C. to 360° C. Besides, the crystallized glass described in this patent application publication (JP-A-2005-228570) has cross-linking sulfur, similar to the foregoing glass ceramics.

Sulfide solid electrolyte materials that have a cross-linking chalcogen represented by the cross-linking sulfur have a problem of being liable to decompose due to the reaction with the positive electrode active material and therefore having low durability while having an advantage of having high ionic conductivity.

SUMMARY OF THE INVENTION

The invention provides an all-solid-state battery that is excellent in durability.

An all-solid-state battery in a first aspect of the invention includes: a positive electrode active material layer that contains a positive electrode active material, and a first sulfide solid electrolyte material that contacts the positive electrode active material and that substantially does not have a cross-linking chalcogen; a negative electrode active material layer containing a negative electrode active material; and a solid electrolyte layer that is provided between the positive electrode active material layer and the negative electrode active material layer, and that contains a second sulfide solid electrolyte material that substantially has a cross-linking chalcogen.

According to the first aspect of the invention, since the first sulfide solid electrolyte material is employed in the positive electrode active material layer, the contact between the positive electrode active material and the second sulfide solid electrolyte material can be restrained, so that the decomposition of the cross-linking chalcogen contained in the second sulfide solid electrolyte material can be restrained. Due to this, an all-solid-state battery excellent in durability can be obtained.

In the first aspect, the cross-linking chalcogen of the first sulfide solid electrolyte material and the cross-linking chalcogen of the second sulfide solid electrolyte material may be cross-linking sulfur. Therefore, an all-solid-state battery that produces greater output can be obtained.

In the first aspect, the first sulfide solid electrolyte material may be a sulfide of P or Ge. Since the first sulfide solid electrolyte material contains P or Ge as a framework element, it is possible to obtain an all-solid-state battery that is excellent not only in the normal-temperature storability but also in high-temperature storability.

In the first aspect, the positive electrode active material may be an oxide positive electrode active material. This is suitable because the oxide positive electrode active material is apt to react with the second sulfide solid electrolyte material and therefore the effect of this aspect is apt to be achieved.

In the first aspect, the positive electrode active material may be coated with a Li ion conductive oxide. The Li ion conductive oxide may be $LiNbO_3$. This will further restrain the reaction between the positive electrode active material and the first sulfide solid electrolyte material, so that an all-solid-state battery that is even more excellent in durability can be obtained.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments and examples of the all-solid-state battery of the invention will be described in detail. The all-solid-state battery of the invention includes: a positive electrode active material layer that contains a positive electrode active material, and a first sulfide solid electrolyte material that contacts the positive electrode active material and that substantially does not have a cross-linking chalcogen; a negative electrode active material layer containing a negative electrode active material; and a solid electrolyte layer that is provided between the positive electrode active material layer and the negative electrode active material layer, and that contains a second sulfide solid electrolyte material that substantially has a cross-linking chalcogen.

According to this embodiment, since the first sulfide solid electrolyte material is used in the positive electrode active material layer, the contact between the positive electrode active material and the second sulfide solid electrolyte material can be restrained. Due to this, the decomposition of the cross-linking chalcogen contained in the second sulfide solid electrolyte material can be restrained. Due to this, an all-solid-state battery excellent in durability can be obtained. Furthermore, if the second sulfide solid electrolyte material excellent in ionic conductivity is used in the solid electrolyte layer, a high-output all-solid-state battery can be obtained. Besides, the all-solid-state battery of this embodiment has an advantage of being excellent in the normal-temperature stability, which is an index of durability.

Figure 1:
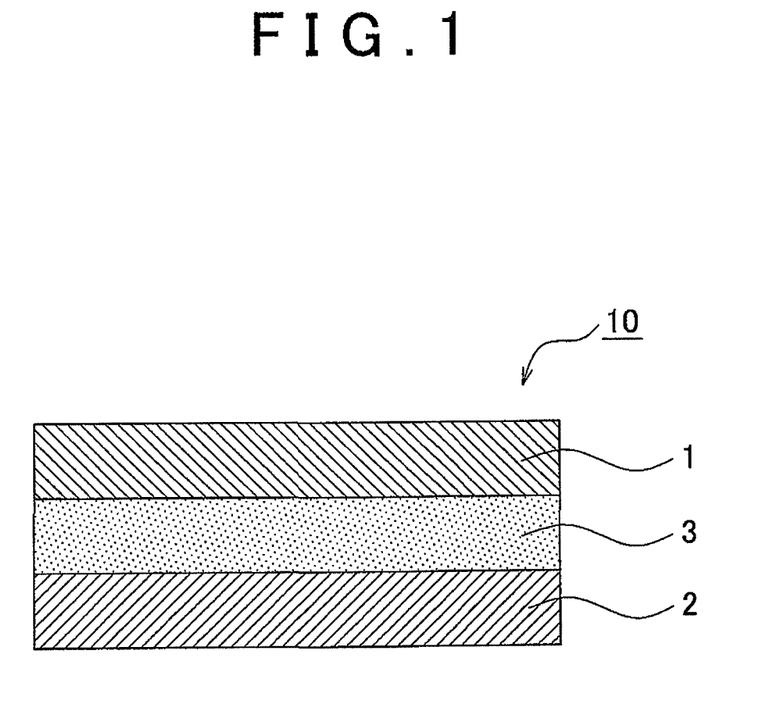
FIG. 1 is an illustrative diagram showing an example of an electricity-generating element of the all-solid-state battery of the invention.

FIG. 1 is a schematic sectional view showing an example of an electricity-generating element in this embodiment. An electricity-generating element 10 shown in FIG. 1 has: a positive electrode active material layer 1 containing a positive electrode active material, and a first sulfide solid electrolyte material that contacts the positive electrode active material and that substantially does not have a cross-linking chalcogen; a negative electrode active material layer 2 containing a negative electrode active material; and a solid electrolyte layer 3 that is provided between the positive electrode active material layer 1 and the negative electrode active material layer 2, and that contains a second sulfide solid electrolyte material that substantially has a cross-linking chalcogen. An all-solid-state battery of this embodiment will be described hereinafter separately for each component.

1. Positive Electrode Active Material Layer

Firstly, the positive electrode active material layer in this embodiment will be described. The positive electrode active material layer in this embodiment is a layer containing at least a positive electrode active material, and a first sulfide solid electrolyte material that substantially does not have a cross-linking chalcogen, and may further contain a conductive material in accordance with need.

(1) First Sulfide Solid Electrolyte Material

The first sulfide solid electrolyte material in this embodiment substantially does not have a cross-linking chalcogen. Examples of the cross-linking chalcogen include cross-linking sulfur (—S—), cross-linking oxygen (—O—), etc. It is preferable that the first sulfide solid electrolyte material at least substantially not have cross-linking sulfur, that is, be substantially free from at least cross-linking sulfur. It is more preferable that the first sulfide solid electrolyte substantially not have either cross-linking sulfur or cross-linking oxygen, that is, be substantially free from both cross-linking sulfur and cross-linking oxygen. The term "substantially does not have cross-linking chalcogen" means that the proportion of the cross-linking chalcogen contained in the first sulfide solid electrolyte material is low that the first sulfide solid electrolyte material is not affected by the reaction thereof with the positive electrode active material. In this case, the proportion of the cross-linking chalcogen is preferably 10 mol % or less, and more preferably 5 mol % or less. Incidentally, it can be determined that the first sulfide solid electrolyte material "substantially does not have a cross-linking chalcogen", for example, by considering results of the Raman spectrum measurement, the raw material composition proportion, results of the NMR measurement, etc.

Besides, in this embodiment, the first sulfide solid electrolyte material is preferred to be made from a raw material composition that contains $Li_2S$ and the sulfide of a group 13 to 15 element, and is preferred to substantially not have cross-linking sulfur or $Li_2S$. This construction sufficiently lowers the reactivity of the first sulfide solid electrolyte material with the positive electrode active material. Besides, since the first sulfide solid electrolyte material as described above has an ortho-composition, or a composition close to the ortho-composition, this first sulfide solid electrolyte material is considered to be able to sufficiently lower the reactivity with the positive electrode active material. It is to be noted herein that the term "ortho" generally refers to the most highly hydrated one of the oxo acids that are obtained by hydrating a single oxide. In the embodiment, a crystal composition with the greatest amount of $Li_2S$ added among the sulfides is termed the ortho-composition. For example, in the system $Li_2S$—$P_2S_5$, $Li_3PS_4$ is the ortho-composition. In the system $Li_2S$—$Al_2S_3$, $Li_3AlS_3$ is the ortho-composition. In the system $Li_2S$—$SiS_2$, $Li_4SiS_4$ is the ortho-composition. In the system $Li_2S$—$GeS_2$, $Li_4GeS_4$ is the ortho-composition. For example, in the case of the sulfide solid electrolyte material in the system $Li_2S$—$P_2S_5$ or the system $Li_2S$—$Al_2S_3$, the molar fraction of $Li_2S$ that obtains the ortho-composition is 75%. On the other hand, in the case of the sulfide solid electrolyte material in the system $Li_2S$—$SiS_2$ or the system $Li_2S$—$GeS_2$, the molar fraction of $Li_2S$ that obtains the ortho-composition is 66.7%.

Besides, the foregoing sulfide solid electrolyte material substantially does not have either cross-linking sulfur or $Li_2S$, that is, is substantially free from cross-linking sulfur and $Li_2S$. It is to be noted herein that the term "cross-linking sulfur" refers to cross-linking sulfur in compounds formed by the reaction between $Li_2S$ and a sulfide of a group 13 to 15 element. For example, the cross-linking sulfur in the $S_3P$—S—$PS_3$ structure formed by the reaction between $Li_2S$ and $P_2S_5$ is what the term "cross-linking sulfur" refers to. This cross-linking sulfur is liable to react with the positive electrode active material and therefore decompose. In this embodiment, if the proportion of $Li_2S$ in the raw material composition is excessively small, the sulfide solid electrolyte material contains cross-linking sulfur. Furthermore, it can be checked that the first sulfide solid electrolyte material "substantially does not have cross-linking sulfur" by measurement using the Raman spectrum.

It is to be noted herein that it is preferable that the peak of $S_3P$—S—$PS_3$ be absent in the Raman spectrum in the case where the first sulfide solid electrolyte material is a sulfide solid electrolyte material of the system $Li_2S$—$P_2S_5$. The peak of $S_3P$—S—$PS_3$ usually appears at a wave number of 402 $cm^{-1}$. Therefore, in this embodiment, it is preferable that this peak be not detected. Besides, the peak of $PS_4$ usually appears at a wave number of 417 $cm^{-1}$. In this embodiment, it is preferable that the intensity $I_{402}$ at 402 $cm^{-1}$ be smaller than the intensity $I_{417}$ at 417 $cm^{-1}$. Concretely, $I_{402}/I_{417}$ is preferably 0.7 or less, and more preferably 0.5 or less, and even more preferably 0.35 or less.

The term "substantially does not have $Li_2S$" means to substantially not have $Li_2S$ that derives from the starting raw material. $Li_2S$ is liable to react with the positive electrode active material and therefore decompose. In this embodiment, if the proportion of $Li_2S$ in the raw material composition is excessively great, the sulfide solid electrolyte material contains $Li_2S$. Furthermore, it can be checked that the first sulfide solid electrolyte material "substantially does not have $Li_2S$", by X-ray diffraction. Concretely, in the case where the first sulfide solid electrolyte material does not have the peaks of $Li_2S$ ($2\theta=27.0°, 31.2°, 44.8°, 53.1°$), it can be determined that the first sulfide solid electrolyte material substantially does not have $Li_2S$.

Besides, $Li_2S$ contained in the raw material composition is preferred to be provided with a reduced amount of impurities. If so, subsidiary reactions can be restrained. Examples of the synthesis method for $Li_2S$ include a method described in Japanese Patent Application Publication No. 7-330312 (JP-A-7-330312), and the like. Furthermore, it is also preferable that $Li_2S$ be purified by using a method described in WO2005/040039, or the like.

Besides, the raw material composition contains the sulfide of a group 13 to 15 element. In particular, in this embodiment, it is preferable to use the sulfide of a group 14 or 15 element. This will improve high-temperature storability. The foregoing group 13 to 15 element is not particularly limited. Examples of the group 13 to 15 element include Al, Si, Ge, P, As, Sb, etc., among which P and Ge are preferred. Examples of the sulfide of a group 13 to 15 element include $Al_2S_3$, $SiS_2$, $GeS_2$, $P_2S_3$, $P_2S_5$, $As_2S_3$, $Sb_2S_3$, etc. Incidentally, the raw material composition may contain more than one of the aforementioned sulfides.

Besides, the raw material composition contains preferably at least $Li_2S$ and $P_2S_5$, and more preferably only $Li_2S$ and $P_2S_5$. Likewise, the raw material composition contains preferably at least $Li_2S$ and $Al_2S_3$, and more preferred only $Li_2S$ and $Al_2S_3$. In these cases, the molar fraction of $Li_2S$ contained in the raw material composition is not particularly limited as long as the molar fraction thereof is a proportion that makes it possible to obtain a sulfide solid electrolyte material that substantially does not have either cross-linking sulfur or $Li_2S$. It is preferable that the molar fraction of $Li_2S$ contained in the raw material composition be, for example, in the range of 70% to 85%, and particularly in the range of 70% to 80%, and more particularly in the range of 72% to 78%. If the range of the molar fraction of $Li_2S$ is set in a range that includes a value of the molar fraction thereof that achieves an ortho-composition (which is 75%) and its vicinity, a sulfide solid electrolyte material that has low reactivity with the positive electrode active material can be obtained.

Besides, the foregoing raw material composition contains preferably at least $Li_2S$ and $SiS_2$, and more preferably only $Li_2S$ and $SiS_2$. Likewise, the raw material composition contains preferably at least $Li_2S$ and $GeS_2$, and more preferably only $Li_2S$ and $GeS_2$. In these cases, the molar fraction of $Li_2S$ contained in the raw material composition is not particularly limited as long as the molar fraction thereof is a proportion that makes it possible to obtain a sulfide solid electrolyte material that substantially does not have either cross-linking sulfur or $Li_2S$. It is preferable that the molar fraction of $Li_2S$ contained in the raw material composition be, for example, in the range of 50% to 80%, and particularly in the range of 55% to 75%, and more particularly in the range of 60% to 70%. If the range of the molar fraction of $Li_2S$ is set in a range that includes a value of the molar fraction thereof that achieves an ortho-composition (which is 66.7%) and its vicinity, a sulfide solid electrolyte material that has low reactivity with the positive electrode active material can be obtained.

Examples of the method of synthesizing the first sulfide solid electrolyte material by using the foregoing raw material composition include a decrystallization method. Examples of the decrystallization method include a mechanical milling method and a melt quenching method, of which the mechanical milling method is preferred. The mechanical milling method allows a process at normal temperature, and makes it possible to simplify the manufacturing process.

The first sulfide solid electrolyte material may be a sulfide glass, and may also be a crystallized sulfide glass that is obtained by subjecting the sulfide glass to a thermal process. Incidentally, the sulfide glass can be obtained by, for example, the foregoing decrystallization method. Besides, the temperature of the thermal process performed to synthesize the crystallized sulfide glass is preferred to be, for example, in the range of 150° C. to 360° C., and particularly in the range of 200° C. to 350° C.

In this embodiment, the first sulfide solid electrolyte material is disposed in the positive electrode active material layer so as to contact the positive electrode active material. In particular, in the embodiment, the amount of the first sulfide solid electrolyte material contained in the positive electrode active material layer is preferred to be larger in a surface of a side thereof where the positive electrode active material layer contacts the solid electrolyte layer. (It is preferred that the amount of the first sulfide solid electrolyte material contained in a surface of a side of the positive electrode active material layer where the positive electrode active material layer contacts the solid electrolyte layer is larger than the amount of the first sulfide solid electrolyte material contained in a portion thereof where the positive electrode active material layer does not contact the solid electrolyte layer.) This will efficiently reduce the contact between the positive electrode active material and the second sulfide solid electrolyte material. In particular, in this embodiment, it is preferred that the positive electrode active material layer has, on the surface of the side of contact with the solid electrolyte layer, a thin film layer that is made up only of the first sulfide solid electrolyte material. This will further efficiently reduce the contact of the positive electrode active material with the second sulfide solid electrolyte material.

Besides, examples of the configuration of the first sulfide solid electrolyte material include a particle configuration. In particular, the configuration of the first sulfide solid electrolyte material is preferred to be true spherical or elliptical spherical. Besides, in the case where the first sulfide solid electrolyte material has a particle configuration, the average particle diameter thereof is preferred to be, for example, in the range of 0.1 μm to 50 μm. The amount of the first sulfide solid electrolyte material in the positive electrode active material layer is preferred to be, for example, in the range of 1 wt % to 80 wt %, and particularly in the range of 10 wt % to 70 wt %, and more particularly in the range of 15 wt % to 50 wt %. If the content of the first sulfide solid electrolyte material is excessively small, there arises a possibility of failing to sufficiently restrain the contact between the positive electrode active material and the second sulfide solid electrolyte material. If the content of the first sulfide solid electrolyte material is excessively large, there arises a possibility of decrease of the capacity.

(2) Positive Electrode Active Material

Next, a positive electrode active material in this embodiment will be described. The positive electrode active material in this embodiment varies depending on the kind of the conductive ion of the intended all-solid-state battery. For example, in the case where the all-solid-state battery of this embodiment is an all-solid-state lithium secondary battery, the positive electrode active material stores and releases lithium ions.

The positive electrode active material used in this embodiment is not particularly limited as long as it decomposes the cross-linking chalcogen of the second sulfide solid electrolyte material. Examples of the positive electrode active material in this embodiment include an oxide positive electrode active material. The oxide positive electrode active material is apt to react with the second sulfide solid electrolyte material, and is therefore likely to achieve the effects of the invention. Besides, by using the oxide positive electrode active material, an all-solid-state battery with high energy density can be obtained. Examples of the oxide positive electrode active material used in the all-solid-state lithium battery include positive electrode active materials expressed by a general formula LixMyOz (M is a transition metal element, x=0.02 to 2.2, y=1 to 2, and z=1.4 to 4). In the general formula, M is preferably at least one species selected from the group consisting of Co, Mn, Ni, V, Fe and Si, and more preferably at least one species selected from the group consisting of Co, Ni and Mn. Concrete examples of the foregoing oxide positive electrode active material include $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$, $Li_2MnSiO_4$, etc. Besides, examples of the positive electrode active material other than these expressed by the general formula LixMyOz include olivine-type positive electrode active materials such as $LiFePO_4$, $LiMnPO_4$, etc.

Examples of the configuration of the positive electrode active material include a particle configuration. In particular, the configuration thereof is preferred to be true spherical or elliptical spherical. Besides, in the case where the positive electrode active material has a particle configuration, the average particle diameter thereof is preferred to be, for example, in the range of 0.1 μm and 50 μm. The content of the positive electrode active material in the positive electrode active material layer is preferably, for example, in the range of 10 wt % to 99 wt %, and more preferably, for example, in the range of 20 wt % to 90 wt %.

The positive electrode active material in this embodiment is preferred to be coated with a Li ion conductive oxide. This will further restrain the reaction between the positive electrode active material and the first sulfide solid electrolyte material. Besides, even in a construction in which the positive electrode active material and the second sulfide solid electrolyte material contact, the area of contact therebetween can be reduced by the coat of a Li ion conductive oxide. Examples of the Li ion conductive oxide include $LiNbO_3$, $Li_4Ti_5O_{12}$, $LiTiO_3$, $Li_2ZrO_3$, etc.

The thickness of the Li ion conductive oxide that coats the positive electrode active material is preferably, for example, in the range of 1 nm to 500 nm, and more preferably, for example, in the range of 2 nm to 100 nm. If the thickness of the Li ion conductive oxide is excessively small, there arises a possibility of failing to sufficiently restrain the reaction between the positive electrode active material and the sulfide solid electrolyte material. If the thickness of the Li ion conductive oxide is excessively great, there arises a possibility of decrease of the ionic conductivity. Besides, the Li ion conductive oxide is preferred to coat much of the surface area of the positive electrode active material. Concretely, the proportion of coating is preferably 40% or higher, and more preferably 70% or higher, and even more preferably 90% or higher. Examples of the method of coating the positive electrode active material with the Li ion conductive oxide include a tumbling fluidized coating method (sol-gel method), a mechanical fusion method, a CVD method, a PVD method, etc.

(3) Positive Electrode Active Material Layer

The positive electrode active material layer in this embodiment may further contain a conductive material. Addition of the conductive material improves the conductivity of the positive electrode active material layer. Examples of the conductive material include acetylene black, Ketjen black, carbon fiber, etc. Besides, the content of the conductive material in the positive electrode active material layer is not particularly limited. For example, the content thereof is preferred to be in the range of 0.1 wt % to 20 wt %. Besides, the thickness of the positive electrode active material layer varies depending on the kind of the intended all-solid-state battery, but is preferred to be, for example, in the range of 1 μm to 100 μm.

2. Solid Electrolyte Layer

Next, the solid electrolyte layer in this embodiment will be described. The solid electrolyte layer in this embodiment is a layer that is provided between the positive electrode active material layer and the negative electrode active material layer, and that contains a second sulfide solid electrolyte material that substantially has a cross-linking chalcogen.

The second sulfide solid electrolyte material in this embodiment substantially has a cross-linking chalcogen. Examples of the cross-linking chalcogen include cross-linking sulfur (—S—), cross-linking oxygen (—O—), etc. The second sulfide solid electrolyte material is preferred to have at least cross-linking sulfur, and may also substantially have both cross-linking sulfur and cross-linking oxygen. The term "substantially has a cross-linking chalcogen" means that the proportion of the cross-linking chalcogen contained in the second sulfide solid electrolyte material is high such that the second sulfide solid electrolyte material is affected by the reaction thereof with the positive electrode active material. In this case, the proportion of the cross-linking chalcogen is preferably 20 mol% or higher, and more preferably 40 mol% or higher. Incidentally, it can be determined that the first sulfide solid electrolyte material "substantially has a cross-linking chalcogen", for example, by considering results of the measurement using the Raman spectrum, the raw material composition proportion, results of the NMR measurement, etc.

Besides, in this embodiment, the second sulfide solid electrolyte material is preferred to be made from a raw material composition that contains $Li_2S$ and the sulfide of a group 13 to 15 element. The description of $Li_2S$ and the sulfide of a group 13 to 15 element which is to be given herein is substantially the same as the description thereof given above in "1. POSITIVE ELECTRODE ACTIVE MATERIAL LAYER". In particular, in this embodiment, the group 13 to 15 element is preferred to be P.

It is to be noted that it is preferred that the peak of $S_3P$—$S$—$PS_3$ be present in the Raman spectrum in the case where the second sulfide solid electrolyte material is a sulfide solid electrolyte material of the $Li_2S$—$P_2S_5$ system. The peak of $S_3P$—$S$—$PS_3$ usually appears at a wave number of 402 cm$^{-1}$, as mentioned above. In this embodiment, the intensity $I_{402}$ at 402 cm$^{-1}$ is preferred to be greater than the intensity $I_{417}$ at 417 cm$^{-1}$. More concretely, I402/I417 is preferably 1.1 or greater, and more preferably 1.3 or greater, and even more preferably 1.6 or greater.

Besides, the raw material composition contains preferably at least $Li_2S$ and $P_2S_5$, and more preferably only $Li_2S$ and $P_2S_5$. Likewise, the raw material composition contains preferably at least $Li_2S$ and $Al_2S_3$, and more preferably only $Li_2S$ and $Al_2S_3$. In these cases, the molar fraction of $Li_2S$ contained in the raw material composition is not particularly limited as long as the molar fraction thereof is a proportion that makes it possible to obtain a sulfide solid electrolyte material that substantially contains cross-linking sulfur. The molar fraction of $Li_2S$ contained in the raw material composition is preferred to be, for example, in the range of 35% to 65%, and particularly in the range of 40% to 60%, and more particularly in the range of 45% to 55%.

Besides, the foregoing raw material composition contains preferably at least $Li_2S$ and $SiS_2$, and more preferably only $Li_2S$ and $SiS_2$. Likewise, the raw material composition contains preferably at least $Li_2S$ and $GeS_2$, and more preferably only $Li_2S$ and $GeS_2$. In these cases, the molar fraction of $Li_2S$ contained in the raw material composition is not particularly limited as long as the molar fraction thereof is a proportion that makes it possible to obtain a sulfide solid electrolyte material that substantially has cross-linking sulfur. The molar fraction of $Li_2S$ contained in the raw material composition is preferred to be, for example, in the range of 35% to 65%, and particularly in the range of 40% to 60%, and more particularly in the range of 45% to 55%.

Examples of the method of synthesizing the second sulfide solid electrolyte material by using the foregoing raw material composition include a decrystallization method. The description of the decrystallization method which is to be given herein is substantially the same as the description thereof given above in "1. POSITIVE ELECTRODE ACTIVE MATERIAL LAYER". Besides, the second sulfide solid electrolyte material may be a sulfide glass, and may also be a crystallized sulfide glass that is obtained by subjecting the sulfide glass to a thermal process. In particular, the crystallized sulfide glass is preferable. The crystallized sulfide glass is excellent in Li ion conductivity.

Particularly, in this embodiment, the second sulfide solid electrolyte material is preferred to be a crystallized sulfide glass that is expressed by $Li_7P_3S_{11}$. The crystallized sulfide glass by $Li_7P_3S_{11}$ is particularly excellent in Li ion conductivity. Examples of the method of synthesizing $Li_7P_3S_{11}$ include a method described in Japanese Patent Application Publication No. 2005-228570 (JP-A-2005-228570). Concretely, $Li_7P_3S_{11}$ can be synthesized by mixing $Li_2S$ and $P_2S_5$ at a molar ratio of 70:30, and decrystallizing the mixture by a ball mill so as to synthesize a sulfide glass, and then subjecting the obtained sulfide glass to a thermal process at 150° C. to 360° C. In this case, the molar ratio between $Li_2S$ and $P_2S_5$ does not need to be limited to 70:30, but may be changed in the range of 68 to 74:26 to 32.

In this embodiment, the second sulfide solid electrolyte material is preferred to have higher Li ion conductivity than the foregoing first sulfide solid electrolyte material. This makes it possible to obtain an all-solid-state battery of higher output. Concretely, the Li ion conductivity of the second sulfide solid electrolyte material is preferably $1 \times 10^4$ S/cm or higher, and more preferably $1 \times 10^{-3}$ S/cm or higher.

Besides, examples of the configuration of the second sulfide solid electrolyte material include a particle configuration. In particular, the configuration of the second sulfide solid electrolyte material is preferred to be true spherical or elliptical spherical. Besides, in the case where the second sulfide solid electrolyte material has a particle configuration, the average particle diameter thereof is preferred to be, for example, in the range of 0.1 µm to 50 µm. The content of the second sulfide solid electrolyte material in the solid electrolyte layer is preferred to be large. Particularly in this embodiment, the solid electrolyte layer is preferred to be constructed only of the second sulfide solid electrolyte material. This makes it possible to obtain an all-solid-state battery of higher output. Besides, the thickness of the solid electrolyte layer in this embodiment of the invention is preferred to be, for example, in the range of 0.1 µm to 1000 µm, and more preferably in the range of 0.1 µm to 300 µm.

3. Negative Electrode Active Material Layer

Next, the negative electrode active material layer in this embodiment will be described. The negative electrode active material layer in this embodiment contains at least a negative electrode active material, and may further contain at least one of a sulfide solid electrolyte material and a conductive material. The negative electrode active material contained in the layer varies depending on the kind of the conductive ion in the intended all-solid-state battery. Examples of the negative electrode active material include a metal active material and a carbon active material. Examples of the metal active material include In, Al, Si, Sn, etc. On the other hand, examples of the carbon active material include meso-carbon microbeads (MCMB), highly oriented pyrolytic graphite (HOPG), hard carbon, soft carbon, etc. Besides, the sulfide solid electrolyte material and the conductive material that are used in the negative electrode active material layer are substantially the same as in the foregoing positive electrode active material layer. Besides, the thickness of the negative electrode active material layer is, for example, in the range of 1 µm to 200 µm.

4. Other Constructions

The all-solid-state battery of this embodiment has at least the foregoing positive electrode active material layer, the solid electrolyte layer and the negative electrode active material layer. Usually, the all-solid-state battery of this embodiment further has a positive electrode current collector that collects current in the positive electrode active material layer, and a negative electrode current collector that collects current in the negative electrode active material. Examples of the material of the positive electrode current collector include SUS, aluminum, nickel, iron, titanium, carbon, etc., among which SUS is preferred. On the other hand, examples of the material of the negative electrode current collector include SUS, copper, nickel, carbon, etc., among which SUS is preferred. Besides, the thickness, configuration, etc., of the positive electrode current collector and the negative electrode current collector are preferred to be appropriately selected according to the use of the all-solid-state battery, and the like. Besides, the battery case used in this embodiment may be a battery case that is used in common all-solid-state batteries. Examples of the battery case include an SUS-made battery case, and the like. Besides, the all-solid-state battery in this embodiment may be one in which an electricity-generating element is provided within an electrically insulating ring.

5. All-Solid-State Battery

The kind of the conductive ion used in this embodiment is not particularly limited. Examples of the kind of the all-solid-state battery of this embodiment include an all-solid-state lithium battery, an all-solid-state sodium battery, an all-solid-state magnesium battery, an all-solid-state calcium battery, etc., among which the all-solid-state lithium battery and the all-solid-state sodium battery are preferred, and particularly the all-solid-state lithium battery is preferred. Besides, the all-solid-state battery of this embodiment may be a primary battery, and may also be a secondary battery. In particular, the all-solid-state battery of this embodiment is preferred to be a secondary battery. The secondary battery can be repeatedly charged and discharged, and is useful as a vehicle-mounted battery. Examples of the configuration of the all-solid-state battery of this embodiment include a coin configuration, a laminate configuration, a cylindrical configuration, and a rectangular configuration, among which the rectangular configuration and the laminate configuration are preferred, and particularly the laminate configuration is preferred. Besides, in this embodiment, a vehicle equipped with the foregoing all-solid-state battery can be provided.

The manufacturing method for the all-solid-state battery of this embodiment is not particularly limited as long as the method is able to provide the foregoing all-solid-state battery. It is possible to use substantially the same method as a common manufacturing method for all-solid-state batteries. Examples of the manufacturing method for the all-solid-state battery includes a method in which an electricity-generating element is fabricated by sequentially pressing a material that forms a positive electrode active material layer, a material that forms a solid electrolyte layer, and a material that forms a negative electrode active material layer, and such electricity-generating elements are housed within a battery case, and the battery case is caulked.

Incidentally, the invention is not limited to the foregoing embodiments. The foregoing embodiments are merely illustrative, and anything that has substantially the same construction as the technical idea of the invention described in the claims for patent, and that achieves substantially the same operation and effects as the technical idea thereof is encompassed within the technical scope of the invention.

Hereinafter, examples are presented to further concretely describe the invention.

EXAMPLE 1

Synthesis of a Sulfide Solid Electrolyte Material That Does Not Have Cross-Linking Sulfur As starting raw materials, lithium sulfide ($Li_2S$) and phosphorus pentasulfide ($P_2S_5$) were used. These powder materials were weighed in an argon atmosphere within a glove box so as to attain a ratio of $Li_2S:P_2S_5=75:25$ (molar ratio), and then were mixed in an agate mortar to obtain a raw material composition. Next, 1 g of the obtained raw material composition was placed in a 45 ml-zirconia pot, and zirconia balls (10 balls of 10 mm in diameter) were placed therein. Then, the pot was completely closed. This pot was attached to a planetary ball mill, whereby mechanical milling was performed at a revolution speed of 3700 rpm for 40 hours. As a result, a sulfide solid electrolyte material that did not have cross-linking sulfur (i.e., the first sulfide solid electrolyte material) was obtained. Incidentally, the foregoing relation of $Li_2S:P_2S_5=75:25$ (molar ratio) is a relation for obtaining the ortho-composition as described above. Accordingly, the obtained sulfide solid electrolyte material did not have cross-linking sulfur.

(Fabrication of $LiCoO_2$ Coated With $LiNbO_3$)

As metal sources, lithium ethoxide and pentaethoxy niobium were prepared. These metal sources were mixed in ethanol so that the ratio therebetween became equal to the stoichiometric mixture ratio regarding $LiNbO_3$. Furthermore, ethanol was added into this solution to make a precursor solution for $LiNbO_3$. Next, the precursor solution was applied to a surface of $LiCoO_2$ (the oxide positive electrode active material) by a coating apparatus that employed a tumbling fluidized bed. After that, a thermal process was performed under a condition of 350° C. in the atmosphere, providing $LiCoO_2$ coated with $LiNbO_3$. The $LiNbO_3$ coat on $LiCoO_2$ had a coating rate of 70% and an average thickness of 10 nm.

(Fabrication of All-Solid-State Lithium Secondary Battery)

An all-solid-state lithium secondary battery was fabricated by using the sulfide solid electrolyte material that did not have cross-linking sulfur, and $LiCoO_2$ coated with $LiNbO_3$. Firstly, using a press machine, electricity-generating elements 10 as shown in FIG. 1 were fabricated. Herein, a blend material obtained by mixing $LiCoO_2$ coated with $LiNbO_3$ and the sulfide solid electrolyte material that did not have cross-linking sulfur at a weight ratio of 7:3 was used as a material of the positive electrode active material layer 1. Furthermore, indium (In) foil was used as a material that was to form the negative electrode active material layer 2, and $Li_7P_3S_{11}$ (the second sulfide solid electrolyte material) was used as a material that was to form the solid electrolyte layer 3. Incidentally, $Li_7P_3S_{11}$ is a sulfide solid electrolyte material that has cross-linking sulfur ($S_3P$—S—$PS_3$ structure), and was obtained by a method substantially the same as the method described in Japanese Patent Application Publication No. 2005-228570 (JP-A-2005-228570). Finally, using the electricity-generating elements, an all-solid-state lithium secondary battery was obtained.

EXAMPLE 2

An all-solid-state lithium secondary battery was obtained in substantially the same manner as in Example 1, except that germanium sulfide ($GeS_2$) was used instead of phosphorus pentasulfide ($P_2S_5$), and was mixed with $Li_2S$ at a ratio of $Li_2S:GeS_2=67:33$ (molar ratio). Incidentally, the relation of $Li_2S:GeS_2=67:33$ (molar ratio) is a relation for obtaining the ortho-composition as described above. The obtained sulfide solid electrolyte material did not have cross-linking sulfur.

EXAMPLE 3

An all-solid-state lithium secondary battery was obtained in substantially the same manner as in Example 1, except that silicon sulfide ($SiS_2$) was used instead of phosphorus pentasulfide ($P_2S_5$), and was mixed with $Li_2S$ at a ratio of $Li_2S:SiS_2=67:33$ (molar ratio). Incidentally, the relation of $Li_2S:SiS_2=67:33$ (molar ratio) is a relation for obtaining the ortho-composition as described above. The obtained sulfide solid electrolyte material did not have cross-linking sulfur.

EXAMPLE 4

An all-solid-state lithium secondary battery was obtained in substantially the same manner as in Example 1, except that aluminum sulfide ($Al_2S_3$) was used instead of phosphorus pentasulfide ($P_2S_5$). Incidentally, the relation of $Li_2S$:

$Al_2S_3=75:25$ (molar ratio) is a relation for obtaining the ortho-composition as described above. The obtained sulfide solid electrolyte material did not have cross-linking sulfur.

COMPARATIVE EXAMPLE 1

An all-solid-state lithium secondary battery was obtained in substantially the same manner as in Example 1, except that the sulfide solid electrolyte material contained in the positive electrode active material layer and not having cross-linking sulfur was changed to a sulfide solid electrolyte material ($Li_7P_3S_{11}$) having cross-linking sulfur.

[Evaluation](1) Li ION Conductivity

Figure 2:
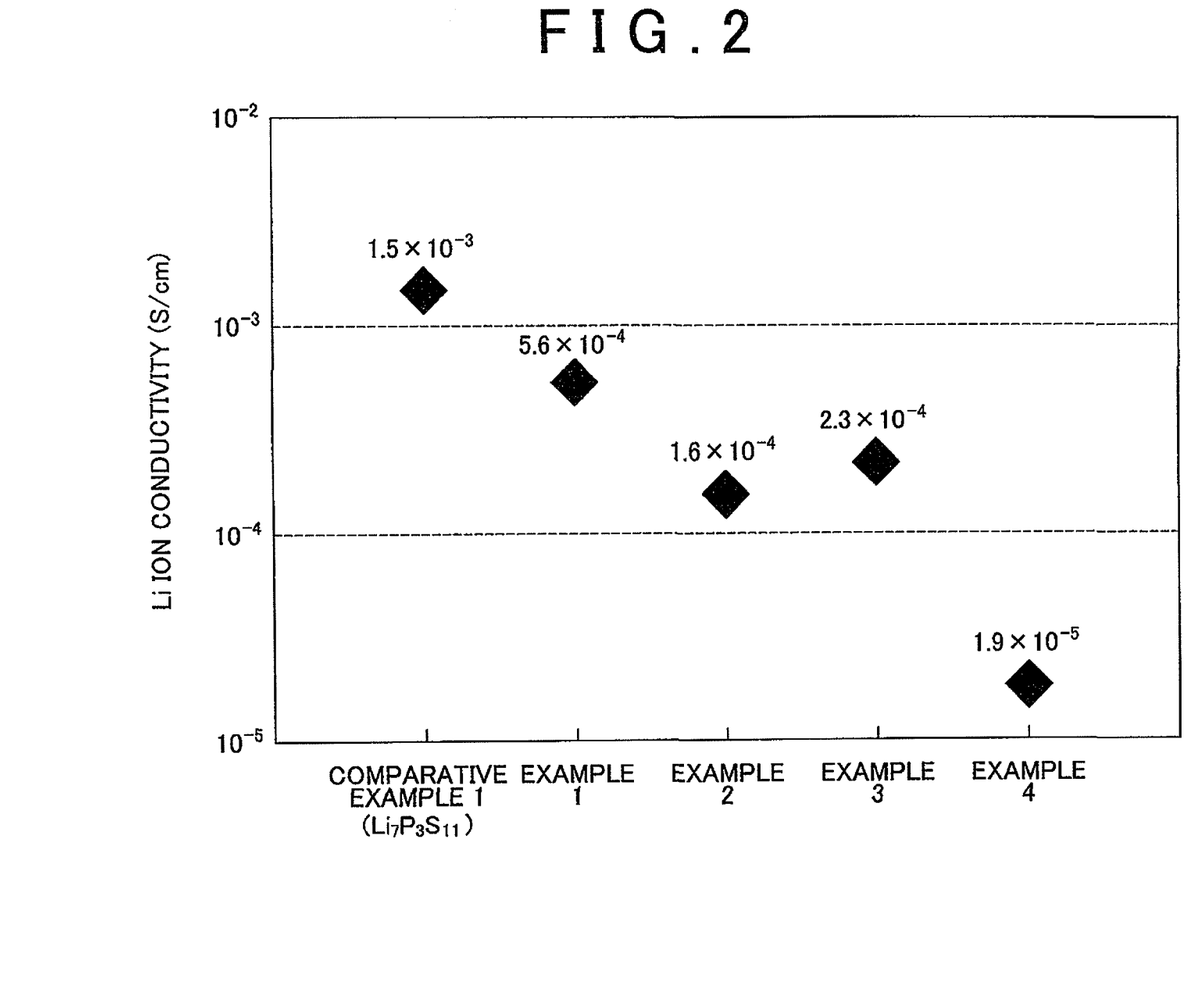
FIG. 2 shows results of measurement of the Li ion conductivity of first sulfide solid electrolyte materials used in Examples 1 to 4.
Figure 3:
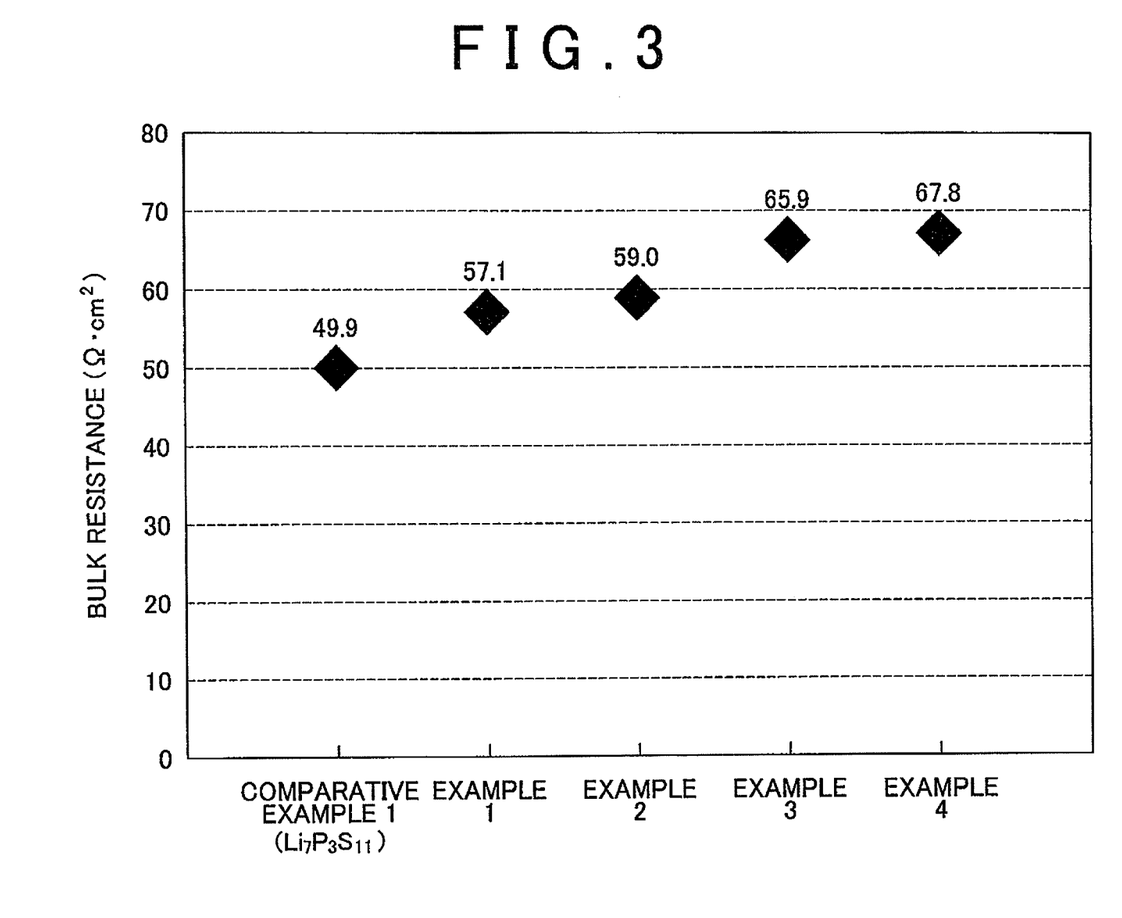
FIG. 3 shows results of measurement of the bulk resistance of the first sulfide solid electrolyte materials used in Examples 1 to 4.

Using the first sulfide solid electrolyte material that was added into the positive electrode active material layer in Examples 1 to 4 and $Li_7P_3S_{11}$ that was added into the positive electrode active material layer in Comparative Example 1, Li ion conductivity was measured. Firstly, the first sulfide solid electrolyte material was pressed at a pressure of 5.1 ton/cm$^2$. Then, this pressed pellet was sandwiched between two pieces of SUS304 to form a two-electrode cell, and the Li ion conductivity of this cell was found by an alternating-current impedance method. The conditions of the impedance measurement were a voltage amplitude of 10 mV, a measurement frequency of 1 MHz to 0.1 Hz, and a temperature 25° C. Results of the measurement are shown in FIG. 2. As shown in FIG. 2, $Li_7P_3S_{11}$ having cross-linking sulfur ($S_3P$—S—$PS_3$ structure) exhibited the highest Li ion conductivity. Besides, results of measurement of the bulk resistance (impedance) of the first sulfide solid electrolyte material are shown in FIG. 3. As shown in FIG. 3, $Li_7P_3S_{11}$ having cross-linking sulfur ($S_3P$—S—$PS_3$ structure) exhibited the lowest bulk resistance. Thus, it has been confirmed that the sulfide solid electrolyte material having cross-linking chalcogen has high Li ion conductivity, and low bulk resistance.

(2) Interface Resistance

Measurement of the interface resistance was performed on the all-solid-state lithium secondary batteries obtained in Examples 1 to 4 and Comparative Example 1. Firstly, the all-solid-state lithium secondary batteries were charged. The batteries were charged by a constant-voltage charging process at 3.34 V for 12 hours. After the charging, the interface resistance between the positive electrode active material layer and the solid electrolyte layer in each battery was found. The conditions of the impedance measurement were a voltage amplitude of 10 mV, a measurement frequency of 1 MHz to 0.1 Hz, and a temperature of 25° C. After that, two manners of storage, that is, normal-temperature storage and high-temperature storage, were performed. The normal-temperature storage was carried out in an environment of 25° C. for 30 days, and the high-temperature storage was carried out in an environment of 60° C. for 35 days. After that, the interface resistance between the positive electrode active material layer and the solid electrolyte layer was found in substantially the same manner as described above. Next, the rates of change in the interface resistance in the normal-temperature storage and the high-temperature storage were found from the initial values of interface resistance and the post-storage values of interface resistance. Results are shown in FIG. 4.

Figure 4:
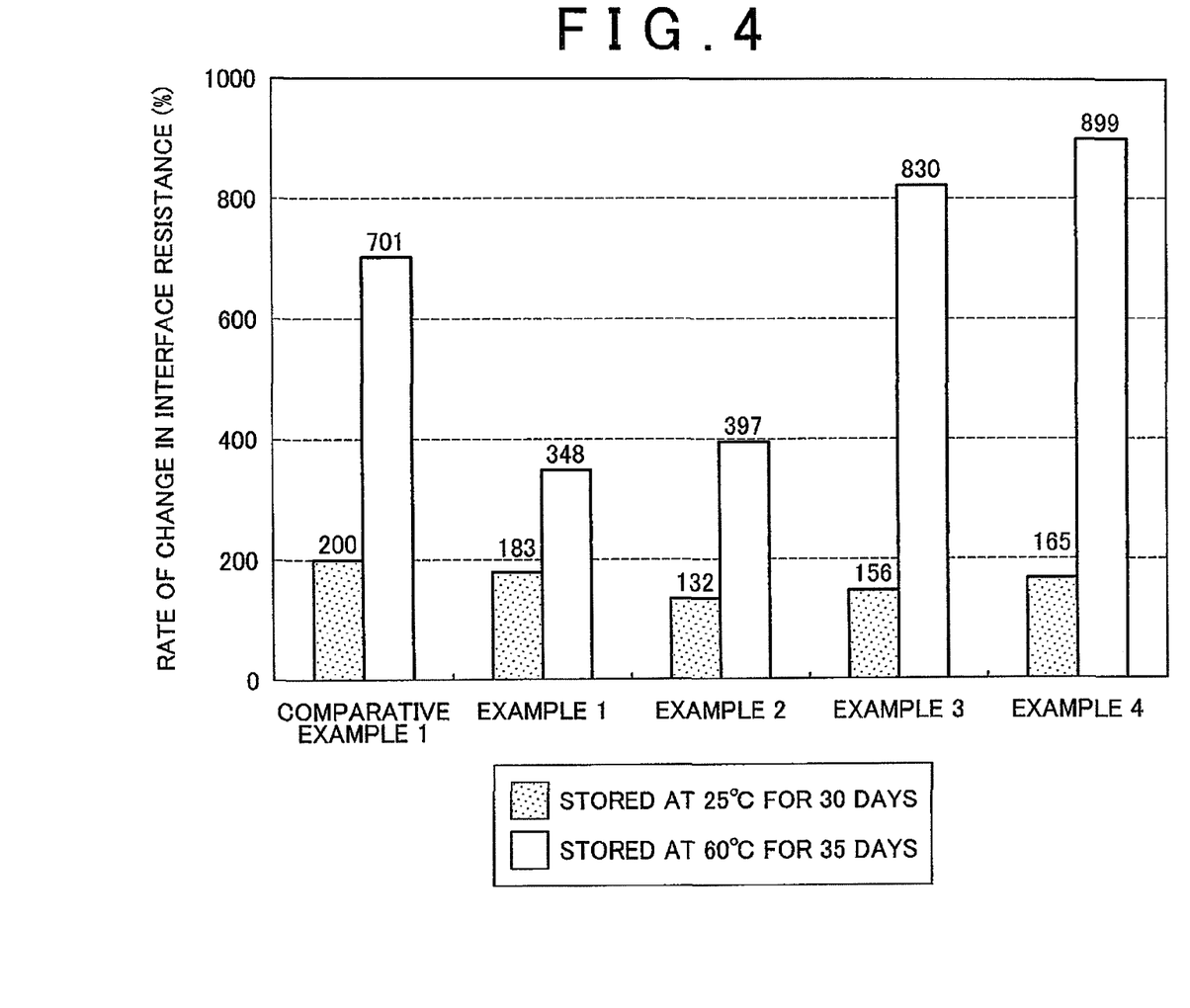
FIG. 4 shows results of measurement of the rate of change in the interface resistance between before and after a storage test of all-solid-state lithium secondary batteries obtained in Examples 1 to 4 and Comparative Example 1.
Figure 5:
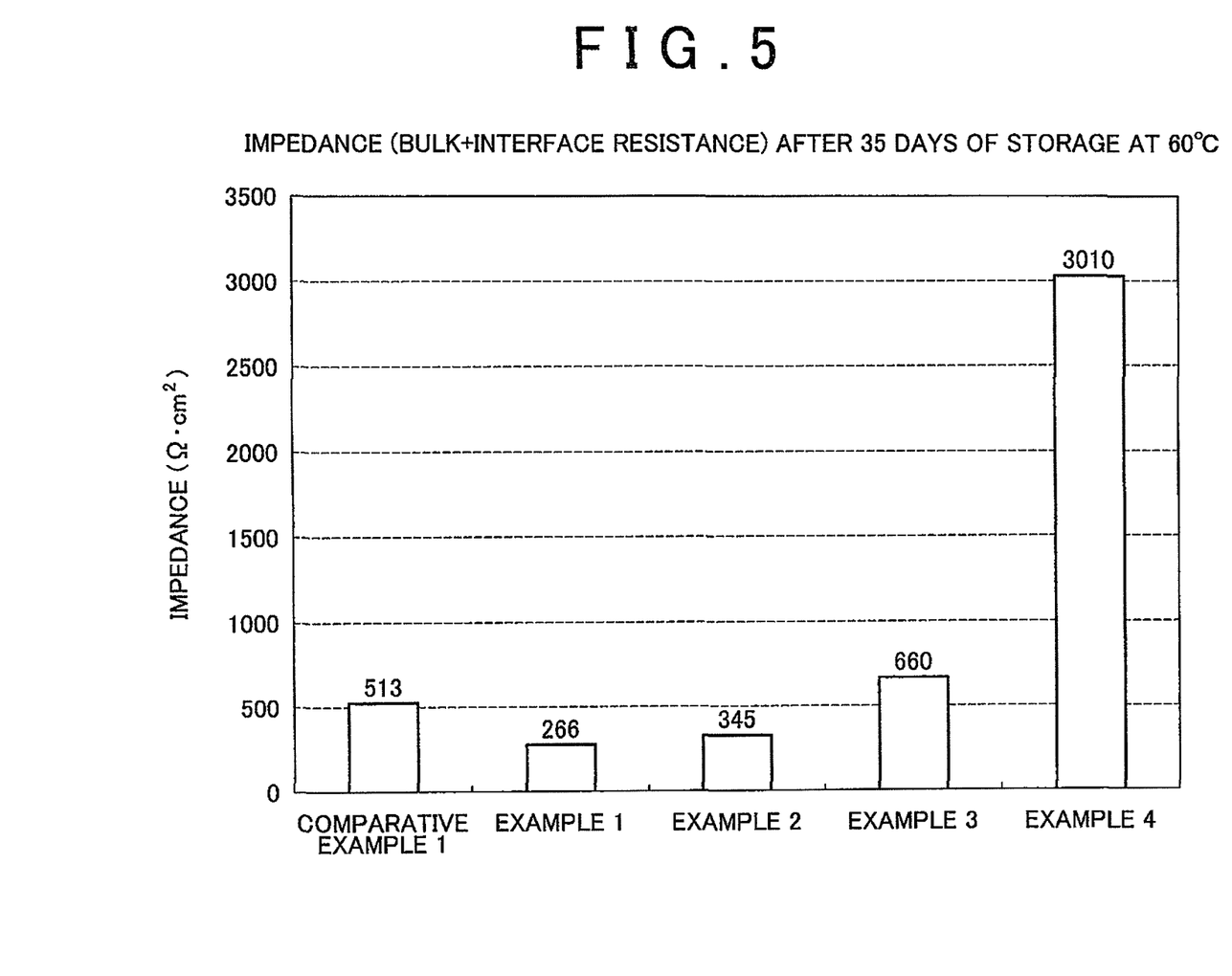
FIG. 5 shows results of measurement of the post-high-temperature-storage impedance of the all-solid-state lithium secondary batteries obtained in Examples 1 to 4 and Comparative Example 1.

As shown in FIG. 4, it was confirmed that in Examples 1 to 4, the rate of change in the interface resistance during the normal-temperature storage was smaller than in Comparative Example 1. It is considered that in Comparative Example 1, the positive electrode active material, and the sulfide solid electrolyte material ($Li_7P_3S_{11}$) having cross-linking sulfur contacted each other, causing decomposition of the cross-linking sulfur, and therefore that the rate of change in the interface resistance became large. Besides, it was confirmed that in Examples 1 and 2, the rate of change in the interface resistance during the high-temperature storage was smaller than in Comparative Example 1. That is, by adding into the positive electrode active material layer a sulfide solid electrolyte material containing P or Ge, all-solid-state batteries excellent in the normal-temperature storability and the high-temperature storability were obtained. Incidentally, the values of impedance (bulk+interface resistance) found following the high-temperature storage are shown in FIG. 5. As shown in FIG. 5, Examples 3 and 4 exhibited higher impedance than Comparative Example 1, but Examples 1 and 2 exhibited lower impedance than Comparative Example 1.

REFERENCE EXAMPLE

Figure 6:
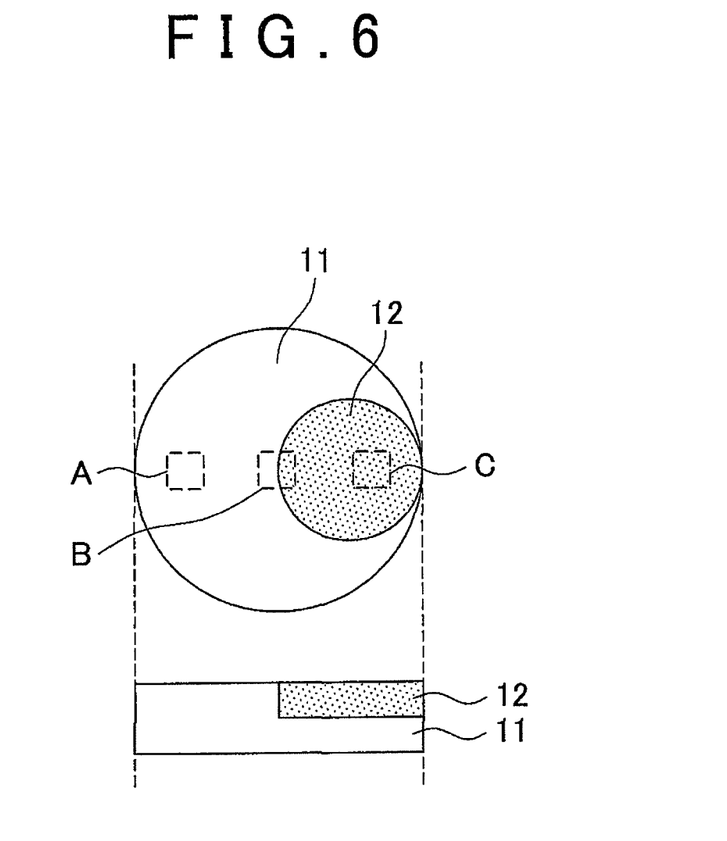
FIG. 6 is an illustrative diagram illustrating a two-phase pellet fabricated in a reference example.

In Reference Example, the state of the interface between the positive electrode active material and the sulfide solid electrolyte material having the cross-linking chalcogen was observed by the Raman spectroscopy. Firstly, $LiCoO_2$ was prepared as a positive electrode active material, and $Li_7P_3S_{11}$ that was used in Example 1 was prepared as a sulfide solid electrolyte material having the cross-linking chalcogen. Then, a two-phase pellet in which the positive electrode active material 12 was incorporated in a portion of the sulfide solid electrolyte material 11 having the cross-linking chalcogen as shown in FIG. 6 was fabricated. After that, the Raman spectrum was measured with respect to region A that was a region of the sulfide solid electrolyte material 11, region B that was a region of interface between the sulfide solid electrolyte material 11 and the positive electrode active material 12, and region C that was a region of the positive electrode active material 12. Results of the measurement are shown in FIG. 7.

Figure 7:
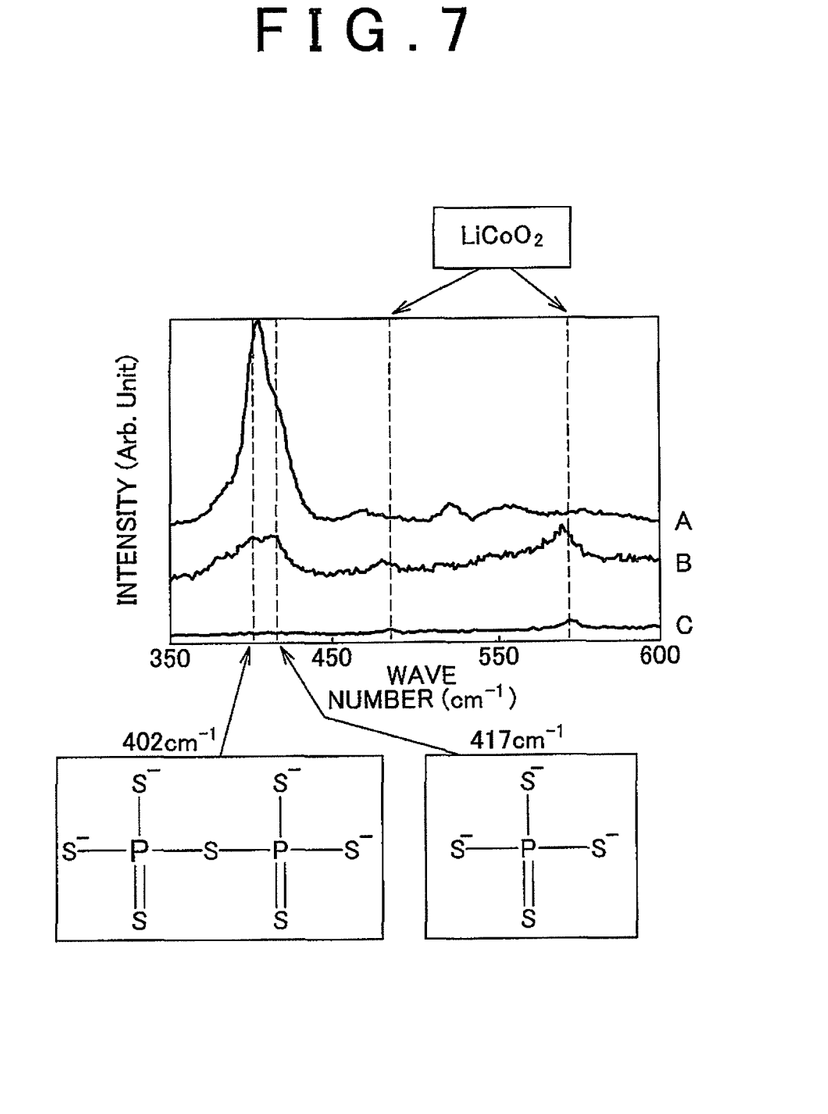
FIG. 7 shows results of the Raman spectroscopic analysis of the two-phase pellet.

In FIG. 7, the peak at 402 cm$^{-1}$ is the peak of the $S_3P$—S—$PS_3$ structure, and the peak of 417 cm$^{-1}$ is the peak of the $PS_4$ structure. In region A, great peaks at 402 cm and 417 cm$^{-1}$ are detected, while in region B, these peaks were smaller, and particularly, the reduction of the peak at the 402 cm$^{-1}$ (the peak of the $S_3P$—S—$PS_3$ structure) was conspicuous. From these observations, it has been confirmed that the $S_3P$—S—$PS_3$ structure that contributes greatly to the lithium ion conductivity readily decomposes due to contact with the positive electrode active material.

What is claimed is:

1. An all-solid-state battery comprising:
   a positive electrode active material layer that includes an oxide positive electrode active material, and a first sulfide solid electrolyte material that contacts the positive electrode active material and that substantially does not have a cross-linking chalcogen;
   a negative electrode active material layer containing a negative electrode active material; and
   a solid electrolyte layer that is provided between the positive electrode active material layer and the negative electrode active material layer, and that contains a second sulfide solid electrolyte material that substantially has a cross-linking chalcogen.

2. The all-solid-state battery according to claim 1, wherein the cross-linking chalcogen of the first sulfide solid electrolyte material and the cross-linking chalcogen of the second sulfide solid electrolyte material are cross-linking sulfur.

3. The all-solid-state battery according to claim 1, wherein the first sulfide solid electrolyte material is a sulfide of P or Ge.

4. The all-solid-state battery according to claim 1, wherein the positive electrode active material is coated with a Li ion conductive oxide.

5. The all-solid-state battery according to claim 4, wherein the Li ion conductive oxide is LiNbO3.

6. The all-solid-state battery according to claim 1, wherein a proportion of the cross-linking chalcogen contained in the first sulfide solid electrolyte material is less than or equal to 10 mol %.

7. The all-solid-state battery according to claim 1, wherein a proportion of the cross-linking chalcogen contained in the second sulfide solid electrolyte material is greater than or equal to 20 mol %.

8. The all-solid-state battery according to claim 1, wherein an amount of the first sulfide solid electrolyte material contained in a surface of a side of the positive electrode active material layer where the positive electrode active material layer contacts the solid electrolyte layer is greater than an amount of the first sulfide solid electrolyte material contained in a portion of the positive electrode active material layer where the positive electrode active material layer does not contact the solid electrolyte layer.

9. The all-solid-state battery according to claim 1, wherein the positive electrode active material layer has a thin-film layer that consists only of the first sulfide solid electrolyte material, on a surface of a side of the positive electrode active material layer where the positive electrode active material layer contacts the solid electrolyte layer contacts.

10. The all-solid-state battery according to claim 1, wherein the second sulfide solid electrolyte material has higher Li ion conductivity than the first sulfide solid electrolyte material.

* * * * *